United States Patent [19]

Nagashima et al.

[11] Patent Number: 4,523,805

[45] Date of Patent: Jun. 18, 1985

[54] DEVICE FOR TRANSFERRING INFORMATION THROUGH FIBEROPTIC BUNDLES WITHOUT DISTORTION OF INFORMATION TRANSFERRED THERETHROUGH

[75] Inventors: Masato Nagashima; Mikizo Katsuyama, both of Kyoto; Masahiro Yamamoto, Shiga, all of Japan

[73] Assignee: Dainippon Screen Manufacturing Co., Ltd., Kyoto, Japan

[21] Appl. No.: 391,735

[22] Filed: Jun. 24, 1982

[30] Foreign Application Priority Data

Jul. 3, 1981 [JP] Japan .................. 56-104680

[51] Int. Cl.³ ............................................. G02B 5/14
[52] U.S. Cl. .................................. 350/96.24; 248/274
[58] Field of Search ...................... 350/96.24, 96.25; 248/274, 276

[56] References Cited

U.S. PATENT DOCUMENTS

| 829,395 | 8/1906 | Garhart | 433/108 |
| 4,333,705 | 6/1982 | Mead | 350/96.2 |
| 4,364,535 | 12/1982 | Itoh et al. | 248/280.1 |

Primary Examiner—William L. Sikes
Assistant Examiner—Robert E. Wise
Attorney, Agent, or Firm—Millen & White

[57] ABSTRACT

A device for supporting, in a manner capable of being displaced, an optical fiber bundle for use in transferring a light beam. The device comprises a plurality of lever means serially connected together in end-to-end relationship, with each lever means being rotatable at one end relative to the adjacent lever means. The optical fiber bundle is fixedly supported by the lever means along the length thereof, in a manner such that the optical fiber bundle can be displaced only by being twisted about its own axis without being subjected to a bending force.

6 Claims, 9 Drawing Figures

DEVICE FOR TRANSFERRING INFORMATION THROUGH FIBEROPTIC BUNDLES WITHOUT DISTORTION OF INFORMATION TRANSFERRED THERETHROUGH

BACKGROUND OF THE INVENTION

The present invention relates to a device for supporting, in a manner capable of being displaced, an optical fiber bundle for use in transferring a light beam. More particularly, the invention relates to a device used in an image scanning and recording system for photoelectrically scanning an original image to produce image signals, and the recording said image on a recording sheet material having a photosensitive agent thereon.

Generally, optical fibers are used for transferring light from a light source to any desired place by simulating bending of light through the use of multiple reflections of light caused in the interior of the optical fibers.

Reference is now made to FIG. 1 of the accompanying drawings showing that when a condenser lens plane 1 is irradiated with light from an optical fiber bundle, a speckled pattern having light and dark areas can be seen, as shown in FIG. 1, instead of a uniform distribution of light. If the entire region of light indicated by a circle B in FIG. 1 is used, the total light quantity will not change. However, if the distance between the irradiated condenser lens plane 1 and the outlet end of the optical fiber bundle is increased, the circle B becomes enlarged, so that a larger system is needed in order to make use of all of the enlarged light beam. As a result, generally only the circle A which is the central area of emitted light is used in the optical system.

In cases where a portion of the light emitted from the optical fiber bundle is used in this manner, changes in the speckled pattern are caused by the movement of the optical fiber bundle; more specifically, because of the nonuniformity of the distribution of the light, changes are produced in the total light within the circle A of the central area of light. For example, if this light beam is used in an image scanning and recording system, the movement of the optical fiber bundle in the subcoordinate scanning directions results in unevenness of an image formed by spots of light, thereby failing to provide an accurate record.

The cause of this problem will now be investigated. The construction of a unit optical fiber F is shown in FIG. 2. The fiber F is formed of a core 2 and a clad 3, and the light beam travels in a light path 4 as shown in FIG. 2b; the light beam travels in the core 2 while reflecting internally off the clad 3. As a result, if the optical fiber F produces a displacement such as by bending, the optical path 4 changes, and so, the distribution of quantity of light emitted from each optical fiber and impinging the condenser lens plane 1 and hence the quantity of light in the circle A will also change.

Thus, where the optical fiber F is used in its absolutely fixed position, no change in the speckled pattern is caused. However, when it is moved is always a change in speckled pattern.

An examination of such changes in the case of bending as one condition of movement of the optical fiber bundle reveals that, as shown in FIG. 3a, corresponding to FIG. 1, a change in the light path 4 is produced, with the speckled pattern in the circle A changing such that it is shifted in and out of the circle A, as indicated by arrows 5, and so, the light quantity in the circle A changes with the bending displacement.

In contrast, where the optical fiber bundle is twisted, as shown in FIG. 3b corresponding to FIG. 1, it has been found that where no bending force acts on the optical fiber bundle, there is no change in speckled pattern in the circle A like the change shown in FIG. 3a; i.e., in the circle A the speckled pattern changes only in the direction of twist (direction of rotation) as indicated by arrow 6, which means that the light quantity in the circle A changes minimally.

SUMMARY OF THE INVENTION

It is therefore a principal object of the invention to provide a device for displacably supporting an optical fiber bundle for transferring a light beam which minimizes the change in the radial direction in the distribution of speckled light patterns transferred by the optical fiber bundle during the displacement of the bundle.

According to the present invention, there is provided a device for supporting an optical fiber bundle in a manner for being displaced and for transferring a light beam. The device comprises a plurality of lever means serially connected together in end-to-end relationship, with each lever means being rotatable at one end thereof relative to the adjacent lever means. The optical fiber bundle is fixedly supported by the lever means along the length thereof, whereby the optical fiber bundle can be displaced only by a twisting movement about its own axis without being subjected to a bending force.

BRIEF DESCRIPTION OF THE DRAWINGS

The present invention will now be described in more detail with reference to an embodiment thereof as shown in the Figures wherein:

FIG. 5 is a partial view, in perspective, of the device of FIG. 4 viewed in the direction of arrow a;

Figure 7:
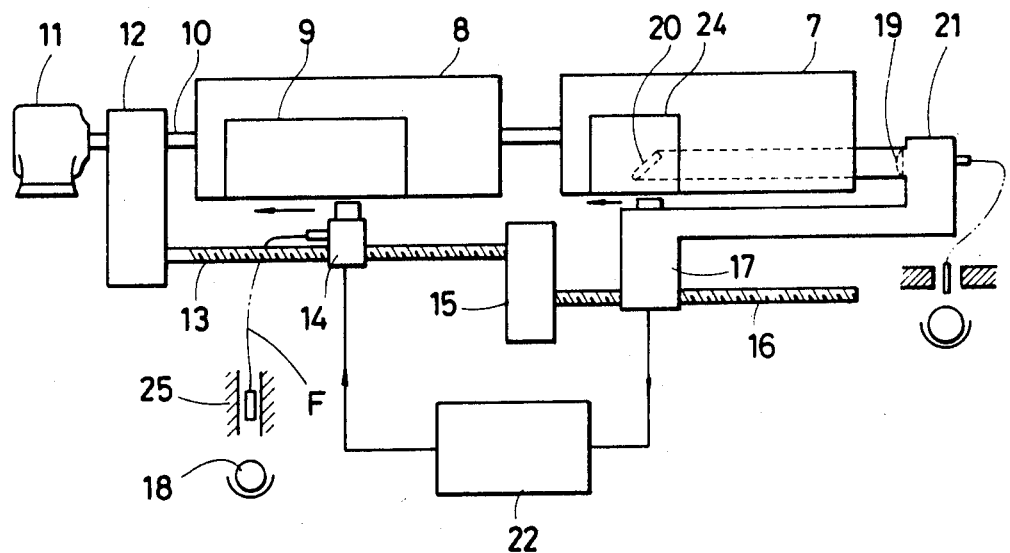
FIG. 7 is a schematic diagram of a color scanner for use in the invention.

First, a prior art color scanner will be described with reference to FIG. 7. In this device a color original or original color print 24 is mounted on cylinder 7 for the original 24 associated with the scanning section, while in the recording section a recording film 9 is mounted on a recording cylinder 8. The cylinders 7 and 8 are synchronously rotated by a common shaft 10. The shaft 10 is driven by a motor 11 through a speed reducer 12, and the rotation of said motor 11 is transmitted to a screw shaft 13 at a different speed reduction ratio to drive a recording head 14 along the recording cylinder 8. The rotation of the screw shaft 13 is transmitted to a screw shaft 16 through a stepless speed change unit 15 for driving a pickup head 17 along the original cylinder 7. The pickup head 17 is equipped with an illuminating device 21 for illuminating the original color print 24, and includes a light source, a condenser 19 and a mirror 20. The pickup head 17 contains a color separation filter and a photoelectric tube and produces image signals in accordance with the tone and gradation of the color original. The image signals are introduced into a color compensation calculation circuit 22. The image signals are amplified and compensated by the color compensation calculation circuit 22 transmitted to the recording head 14, and color separated images are exposed to the recording film 9 by a laser beam.

Figure 1:
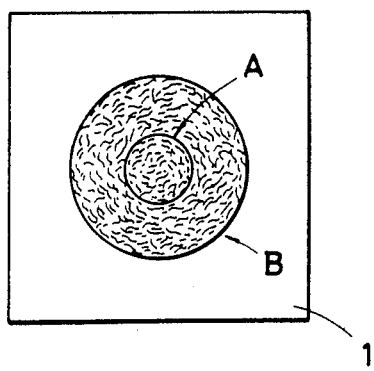
FIG. 1 is, as previously discussed, a schematic view of a condenser lens plane irradiated with light from an optical fiber bundle.
Figure 2A:
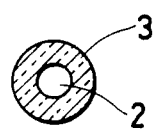
FIGS. 2a and 2b are front and side cross-sectional views of an optical fiber, showing the path of light traveling therein.
Figure 2B:
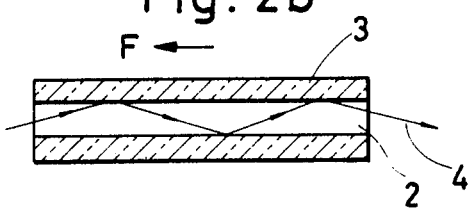
Figure 3A:
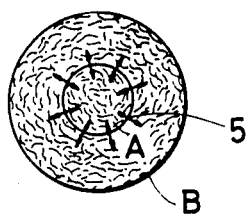
FIGS. 3a and 3b are schematic views of the effect on the light pattern of FIG. 1 caused respectively by bending and by twisting of the optical fiber bundles.
Figure 3B:
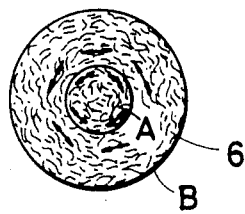
Figure 4:
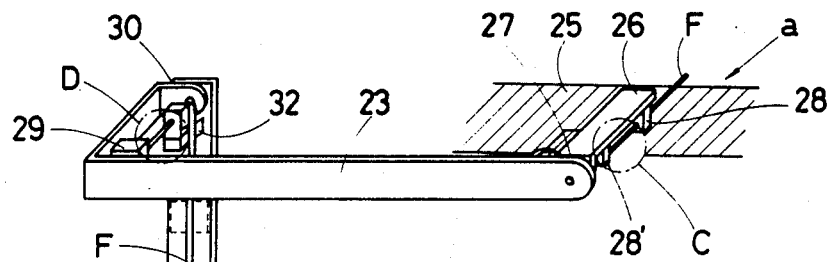
FIG. 4 is a partial view, in perspective of the mechanism of the invention showing the light path from a laser source to a recording head.
Figure 5:
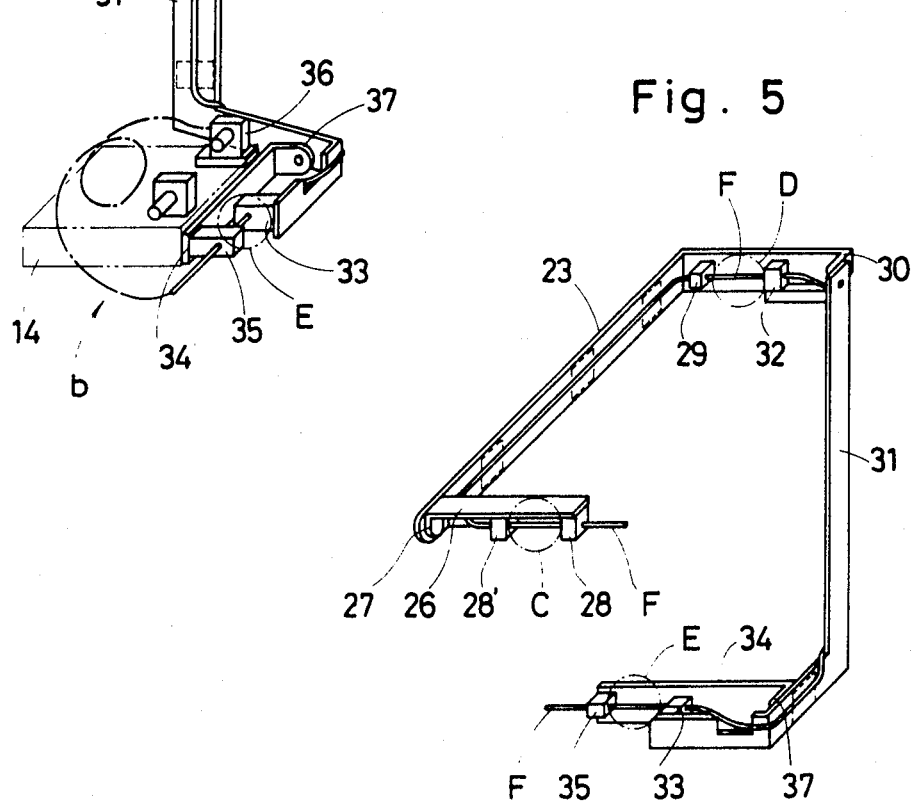
Figure 6:
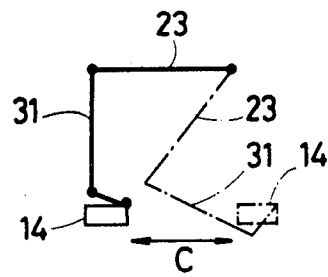
FIG. 6 schematically illustrates the light path in the device of the invention, from a light source.

A light path from a laser beam source 18 to the recording head 14 is shown in detail in FIG. 4, FIG. 5 taken in the direction of arrow a in FIG. 4, and FIG. 6. The light beam emitted from the fixed laser beam source 18 is split into individual beam lines which respectively enter a plurality of optical fibers F, (one of which is shown in the drawings), and travel therein until they are emitted from the moving recording head 14. The optical fibers F extend along and are supported by a plurality of levers 23 and 31 which allow the optical fibers to follow the movement of the recording head 14 while they are being twisted but not bent. The first lever 23 is L-shaped and pivotally supported at one end thereof by the end surface 27 of an angle bar 26 fixed to the sheet metal ceiling 25 of the frame of the device. The angle bar 26 and the lever 23 are provided with brackets 28 and 28', respectively, and the optical fibers F are inserted and fixed in said brackets 28 and 28'' and extend along and are supported by the lateral surface of said first lever 23. Because of such arrangement, pivotal movement of the first lever 23 at the front surface 27 of the angle bar 26 causes twisting movement of the portion C of the optical fibers F inserted and fixed in the brackets 28 and 28'.

On the L-bent side of the first lever 23, a bracket 29 is fixed on the inner side of the first lever 23, while a bracket 32 is fixed on the hooked second lever 31 which pivotally supported on the end surface of the first lever 23. The optical fibers F extending along and are supported on the lateral surface of the first lever 23 are inserted and fixed in these brackets 29 and 32 and extend along and are supported on the lateral surface of the second lever 31. Because of such an arrangement, pivotal movement of the second lever 31 at the end surface 30 of the first lever 31 causes twisting movement of the portion D of the optical fibers F inserted and fixed in the brackets 29 and 32, thus permitting pivotal movement of the second lever 31.

Furthermore, on the hooked bent side of the second lever 31, the optical fibers F extending along and are supported on one side of the second lever 31 are extended to the opposite side and supported on the outer side. The hooked bent side of the second lever 31 has a bracket 33 fixed thereon and faces the recording head 14, while the latter has an angle bar 34 fixed on one side thereof, said angle bar 34 having a bracket 35 fixed thereon. These brackets 33 and 35 have the optical fibers F inserted and fixed therein. The angle bar 34 is pivotally supported at its lateral surface 37 on the second lever 31. The outlet end of the optical fibers F extending through the brackets 33 and 35 are inserted and fixed in a bracket 36 attached to the recording head 14. Because of such arrangement, horizontal reciprocating movement of the recording head 14 along the recording cylinder 8 in the subcoordinate scanning direction causes twisting movement of the portion E of the optical fibers F, thus permitting reciprocating movement of the recording head 14.

In addition, even if the recording head 14 is reciprocated, the portion of the optical fibers F between the brackets 35 and 36 remains fixed, since said brackets 35 and 36 are fixed to the recording head 14.

With the device arranged in the manner described above, when the recording head 14 is reciprocated along the recording cylinder 8 in the horizontal direction (as indicated by the arrow C in FIG. 6), since the angle bar 26 is fixed on the ceiling 25 the first lever 23 swings at the end surface 27 of the angle bar 26, while the opposite ends of the second lever 31 swing at the end surface 30 of the first lever 23 and at the end surface 37 of the angle bar 34. Therefore, the optical fibers F disposed along the first and second levers 23 and 31 are subjected at said portions C, D and E only to a twisting action without being subjected to a bending force. Consequently, the light beam emitted from the optical fibers F impinges the recording cylinder 8 without involving changes in the light quantity. Thus, it is possible to make constant the quantity of light emitted from the outlet end of the optical fibers, to reduce the size of the optical system interposed between said outlet end and the surface to be illuminated, and to reduce the total costs of the device.

We claim:

1. A moveable joint for an optical fiber support arm arranged so that bending of the arm imposes only twisting forces, and not bending forces, on the optical fiber comprising:
(1) an optical fiber comprising;
   (a) a first portion that extends generally in a first direction,
   (b) a second portion that extends generally in a second direction, the second direction being at a predetermined right angle to the first direction, and
   (c) a third portion consisting of the portion of the optical fiber between the first portion and the second portion, and
(2) a jointed optical fiber arm comprising;
   (a) a first support member extending generally in the first direction, and supporting the first portion of the optical fiber,
   (b) a second support member extending generally in the second direction, and supporting the second portion of the optical fiber,
   (c) joint means for joining the first support member and second support member, and for allowing rotation of the second support member with respect to the first support member, and
   (d) the joint means limiting the rotation of the second support member to the plane containing the second support member and lying at the predetermined right angle to the first support member, whereby movement of the second support member with respect to the first support member causes substantially no additional bending or unbending of the optical fiber.

2. A device as in claim 1 further comprising first angle bar means (26) perpendicularly connected to in a rotatable manner relative to said first support member at the end opposite said joint means and supporting a portion of the optical fiber thereon in a manner such that no substantial bending of the fiber occurs, and second angle bar means (34) perpendicularly connected to in a rotatable manner relative to said second support member at the end opposite said joint means and supporting a portion of the optical fiber thereon in a manner such that no substantial bending of the fiber occurs.

3. A device as in claim 1 connected to an image scanning and recording system.

4. A movable joint for an optical bundle support arm arranged so that bending of the arm imposes only twisting forces, and not bending forces, on the optical fiber bundle, comprising:

(1) an optical fiber bundle comprising;
   (a) a first portion that extends generally in a first direction,
   (b) a second portion that extends generally in a second direction, the second direction being at a predetermined right angle to the first direction, and
   (c) a third portion consisting of the portion of the optical fiber bundle between the first portion and the second portion, and (2) a jointed optical fiber bundle arm comprising;
   (a) a first support member extending generally in the first direction, and supporting the first portion of the optical fiber bundle;
   (b) a second support member extending generally in the second direction, and supporting the second portion of the optical fiber bundle,
   (c) joint means for joining the first support member and second support member, and for allowing rotation of the second support member with respect to the first support member, and
   (d) the joint means limiting the rotation of the second support member to the plane containing the second support member and lying at the predetermined right angle to the first support member, whereby movement of the second support member with respect to the first support member causes substantially not additional bending or unbending of the optical fiber bundle.

5. A device as in claim 4 further comprising first angle bar means (26) perpendicularly connected in a rotatable manner relative to said first support member at the end opposite said joint means and supporting a portion of the optical fiber bundles thereon in a manner such that no substantial bending of the fiber occurs, and second angle bar means (34) perpendicularly connected to in a rotatable manner relative to said second support member at the end opposite said joint means and supporting a portion of the optical fiber bundles thereon in a manner such that no substantial bending of the fiber bundles occurs.

6. A device as in claim 4 connected to an image scanning and recording system.

* * * * *